United States Patent [19]

Watts

[11] 4,163,466
[45] Aug. 7, 1979

[54] TUBELESS TIRE, SAFETY SUPPORT AND RIM ASSEMBLY

[75] Inventor: George T. Watts, North Canton, Ohio

[73] Assignee: The Goodyear Tire & Rubber Company, Akron, Ohio

[21] Appl. No.: 858,703

[22] Filed: Dec. 8, 1977

Related U.S. Application Data

[63] Continuation of Ser. No. 695,945, Jun. 14, 1976, abandoned.

[51] Int. Cl.$^2$ .............................................. B60C 17/04
[52] U.S. Cl. .................................. 152/158; 152/399; 152/404
[58] Field of Search ................. 152/158, 330 RF, 399, 152/400, 401, 404, 405

[56] References Cited

U.S. PATENT DOCUMENTS

| 2,028,135 | 1/1936 | Budd | 152/158 X |
|---|---|---|---|
| 2,037,832 | 4/1936 | Stanley | 152/158 |
| 2,989,108 | 6/1961 | Gore | 152/158 |
| 3,509,928 | 5/1970 | Aghnides | 152/158 |
| 3,865,170 | 2/1975 | Mitchell | 152/399 X |
| 3,872,907 | 3/1975 | Curtiss et al. | 152/158 |
| 3,990,491 | 11/1976 | Hampshire et al. | 152/158 |

Primary Examiner—Robert J. Spar
Assistant Examiner—Francis J. Bartuska
Attorney, Agent, or Firm—Frederick K. Lacher; Frank Pincelli

[57] ABSTRACT

A safety support for mounting on a split rim inside a tire chamber to resiliently support the tread portion of the tire in the deflated condition and maintain the bead portions of the tire in separated positions. The support is in the form of an annular ring of resilient material having a base with a relatively wide radially inner surface for seating on the rim and separating the bead portions. A flange extends radially inward from the radially inner surface of the base for gripping by the rim sections to seal the space within the tire and retain the ring on the rim. The radially outer portion of the support has a diameter less than the diameter of the tread portion of the tire in the deflated condition and greater than the diameter of the base portion. The base portion may be of greater width than the radially outer portion and be connected to the outer portion by an intermediate supporting portion of circumferentially spaced-apart radially extending ribs for cushioning the vehicle on which the tire, safety support and rim assembly are mounted.

3 Claims, 2 Drawing Figures

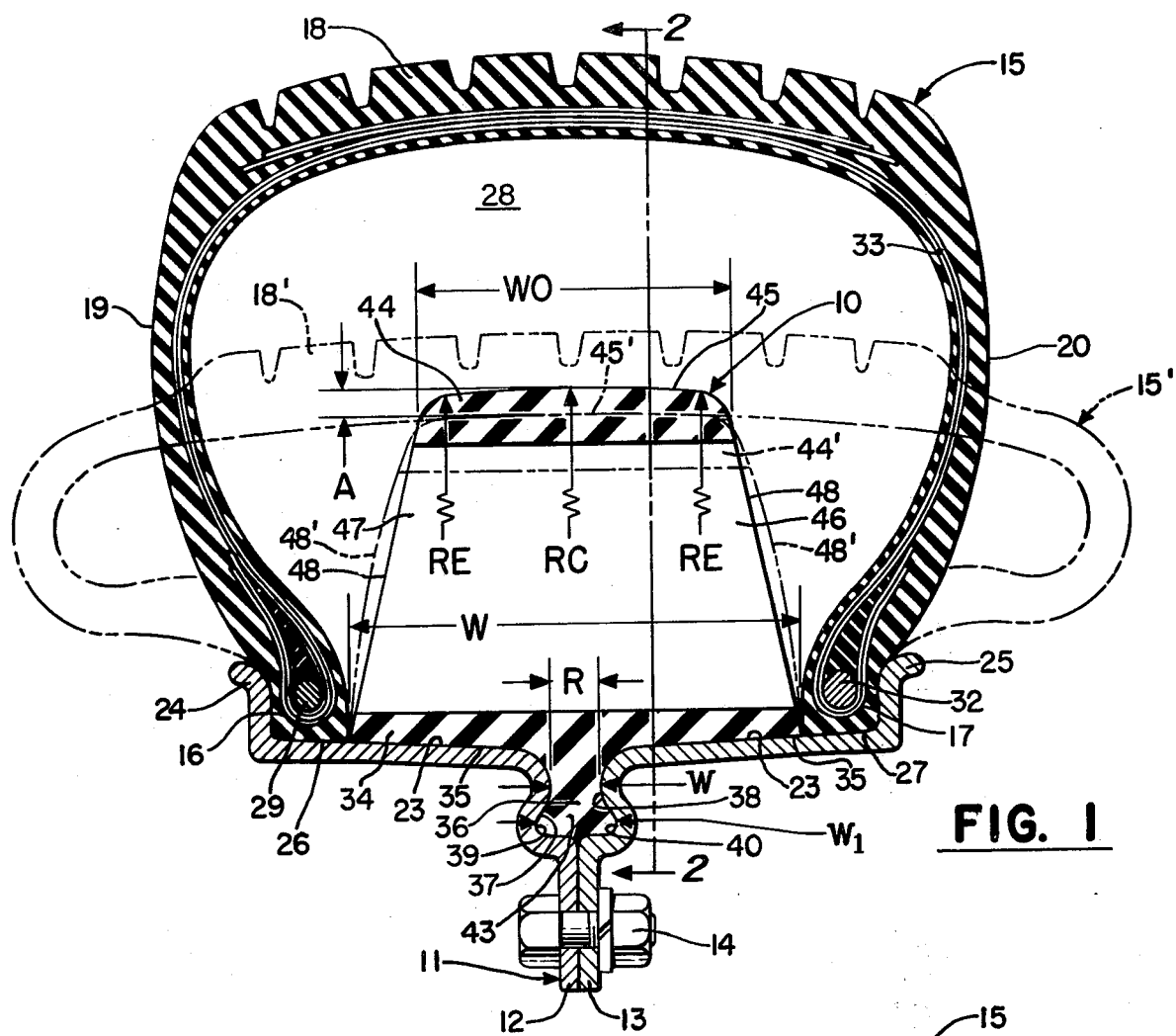
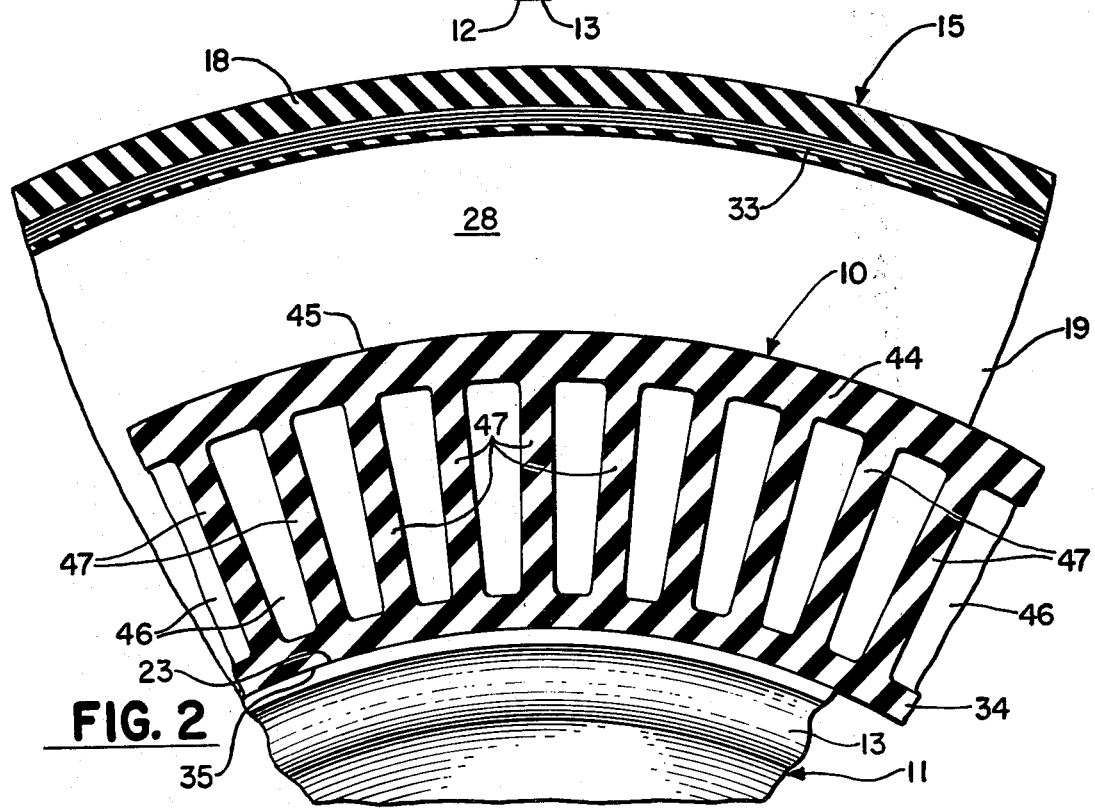

TUBELESS TIRE, SAFETY SUPPORT AND RIM ASSEMBLY

This is a Continuation, of application Ser. No. 695,945 filed June 14, 1976 now abandoned.

This invention relates generally, as indicated, to a safety support, rim seal and bead separator for use on a wheel rim inside the tire chamber to provide support and cushioning with the tire in a deflated condition.

Heretofore buffer rings of resilient material have been proposed for supporting pneumatic tires in the deflated condition; however, under the centrifugal forces generated during rotation of the tire and rim at high speeds, the buffer rings will stretch and be pulled away from the rim surface causing imbalance and other operating problems. Where split rims have been used, special seals have been required between the rim sections to retain air within the tire chamber. Solid buffer rings have also been proposed which have the disadvantage of relatively heavy construction which is not desirable. A solid resilient ring has been proposed for wheels supporting a snowmobile track and these rings have been clamped between wheel sections at the sides of the ring. These rings do not have radially inner supporting surfaces for mounting on generally cylindrical rim surfaces to provide stability but rely on the clamping forces against the sides of the ring for stability which is not desirable for a safety support mounted between the beads of a pneumatic tire.

With the foregoing in mind, it is the principal object of this invention to provide a safety support which is adaptable for mounting on a split rim to resist radially outward movement of the ring during rotation of the rim.

Another object is to provide for sealing the space between the sections of the split rim.

A further object is to provide for restricting lateral movement of bead portions of a tire mounted on the split rim.

A still further object is to provide lateral stability of the support during engagement with the tire tread portion.

Another object is to provide for cushioning with a relatively lightweight support.

These and other objects of this invention are provided by a resilient safety support ring having a relatively wide base for mounting on a split rim and a radially, inwardly extending flange for clamping between the rim sections to seal the chamber within the tire and prevent radially outward movement of the ring during rotation of the rim.

To the accomplishment of the foregoing and related ends, the invention then comprises the features hereinafter fully described and particularly pointed out in the claims. The following descriptions and the annexed drawings set forth in detail a certain illustrative embodiment of the invention, this being indicative, however, of but one of the various ways in which the principles of the invention may be employed.

In the annexed drawings:

FIG. 1 is a cross-sectional view of one side of an annular safety support ring embodying the invention mounted on a split rim inside a tire chamber with the tire and support ring shown in chain-dotted lines in the deflected position during operation in the deflated condition of the tire, the connection of the rim to the wheel not being shown.

FIG. 2 is a fragmentary sectional view taken along the plane of line 2—2 of FIG. 1.

Referring to FIGS. 1 and 2, a safety support in the form of an annular ring member 10 is shown mounted on an annular split rim 11. The rim 11 is part of a wheel of a type well known in the art but not shown in this drawing. The rim 11 has two axially abutting sections 12 and 13 which may be clamped together as by bolt and nut assemblies 14 extending through the sections at circumferentially spaced-apart positions around the rim.

A pneumatic tire 15 is mounted on the rim 11 and has a first bead portion 16 at one edge of the rim and a second bead portion 17 at the other edge. The tire 15 also has a tread portion 18 at the crown of the tire and sidewalls 19 and 20 extending between the first bead portion 16 and tread portion 18 and the second bead portion 17 and the tread portion, respectively.

The rim 11 has a generally cylindrical surface 23 with a first side flange 24 on the rim section 12 and a second side flange 25 on the rim section 13. The first bead portion 16 is seated on a bead seat 26 on the cylindrical surface 23 against the first side flange 24 and the second bead portion 17 is seated on a bead seat 27 at an axially spaced-apart position from bead seat 26. The bead seat 27 is also on the cylindrical surface 23 and supports the second bead portion 17 which is seated against the second side flange 25.

The tire 15 is of a type which is inflatable without a tube and may be of a radial, bias belted or bias ply construction. A valve (not shown) may be provided in the rim 11 for communicating inflating fluid to a chamber 28 within the tire 15. A suitable opening (not shown) may be provided in the ring member 10 for communicating the inflating fluid through the ring member to the valve. As shown in FIGS. 1 and 2, the first bead portion 16 has a circumferentially extending bead 29 and the second bead portion 16 has a circumferentially extending bead 32 around which plies 33 may extend.

Referring to FIGS. 1 and 2, the ring member 10 is preferably of a flexible resilient material such as rubber or microcellular urethane. The ring member 10 has a radially inner base portion 34 with a generally cylindrical radially inner surface 35 for mounting on the cylindrical surface 23 of the rim 11. The width W of the base portion 34 is substantially equal to the distance between the first bead portion 16 and second bead portion 17 for holding the bead portions in position on the bead seats 26 and 27.

A flange 36 integral with the base portion 34 at the radially inner surface 35 extends radially inward from the base portion at a position approximately midway between the edges abutting the bead portions 16 and 17 for clamping between radially extending surfaces 37 and 38 of rim sections 12 and 13, respectively. The distance R between the radially extending surfaces 37 and 38 is preferably less than the width (w) of the flange 36 measured in a direction axially of the ring member 10. Preferably the width W of the base portion 34 is substantially greater than the width (w) of the flange 36 to provide a substantially wide mounting area between the inner surface 35 of the base portion 34 and the cylindrical surface 23 of the rim 11. In the present embodiment, the flange 36 has a width (w) which is approximately twelve percent of the width W of the base portion 34 and preferably the flange width (w) is greater than ten but less than fifteen percent of the base width W.

The flange 36 is circumferentially continuous to provide a seal between the surfaces 37 and 38 of the rim sections 12 and 13. Annular recesses 39 and 40 in the radially extending surfaces 37 and 38, respectively, of the rim sections 12 and 13 may be provided to receive an annular enlarged bulbous edge portion 43 at the radially inner edge of the flange 36. The bulbous edge portion 43 has a width ($w_1$) which is greater than the distance between the surfaces of the recesses 39 and 40 so as to compress the edge portion 43 providing compression loading for sealing and improved gripping of the flange 36 by the rim sections 12 and 13 as shown in FIG. 1.

Radially outward of the base portion 34 is an annular outer portion 44 having a radially outer surface 45 with a diameter less than the diameter of the tread portion 18 in the inflated condition of the tire 15 and greater than the diameter of the base portion 34. The outer portion 44 has a width WO measured axially of the ring member 10 which is less than the width W of the base portion 34. The radially outer surface 45 also has a curved configuration with the radius RC at the center of the outer portion 44 being greater than the radii RE at the edges of the outer portion for transmitting the load from the deflated tire to the rim 11 and maintaining the tire 15' in a centered position as shown in chain-dotted lines in FIG. 1.

An intermediate portion 46 is provided between the base portion 34 and outer portion 44 to provide cushioning with a minimum weight of the ring member 10. Radially extending ribs 47 of the intermediate portion 46 are located at spaced-apart positions circumferentially of the ring member 10. Rib edges 48 of the ribs 47 are sloped outwardly in a direction axially of the ring member 10 and extend from the outer portion 44 to the base portion 34 of the ring member. This configuration of the ribs 47 provides cushioning and stability of the safety support ring member 10 with a minimum of weight.

To assemble the ring member 10 in the tire 15 on the split rim 11, the ring member 10 is inserted between the bead portions 16 and 17 within the tire chamber 28 and one of the bead portions such as bead portion 16 mounted in the bead seat 26 of the rim section 12. It is understood at this point, the rim sections 12 and 13 are separated. At the same time the bead portion 16 is mounted in the bead seat 26, the inner surface 35 of the base portion 34 is mounted on the cylindrical surface 23 of the rim section 12. Next the rim sections 12 and 13 are brought together with the bead portion 17 seated on the bead seat 27 and the inner surface 35 of the base portion 34 seated on the cylindrical surface 23 of the rim section 13. In this process, the valve is aligned with the opening in the ring member 10. The flange 36 with the edge portion 43 is clamped between the radially extending surfaces 37 and 38 of the rim sections 12 and 13 by threaded engagement of the bolt and nut assemblies 14. The bulbous edge portion 43 is thereby compressed in the space within the recesses 39 and 40 of rim sections 12 and 13.

Referring to FIG. 1, the configuration of the tire 15 at the portion in engagement with the road during operation of the tire in the deflated condition is shown in chain-dotted lines. The configuration of the ring member 10 at the portion engaged by the tire is also shown in chain-dotted lines. It will be seen that the outer surface 45' of the outer portion 44' is engaged by the tread portion 18' of the tire 15' and deflects a distance A while the ribs 46 deflect radially inward and axially outward to provide cushioning so that the tire will not be damaged and the vehicle on which the tire 15, ring member 10 and rim 11 are mounted can be driven at a reasonable speed to a place where the tire can be repaired or replaced.

The base portion 34 also holds the bead portions 16 and 17 in a seated position on the bead seats 26 and 27 to further provide the stability necessary for continued running of the tire in the deflated condition. In operation the ring member 10 is deformed while operating with the tire 15 in the deflated condition so as to absorb impacts and protect the tire from damage. In the present embodiment, the deformation is from 0.2 inch to 0.5 inch. It is understood that a fluid may be injected into the tire chamber 28 for cooling and lubricating the tire 15' and ring member 10 during operation in the deflated condition. With this construction, protection is also provided in the event of a blowout and the need for a spare tire is eliminated.

While a certain representative embodiment and details have been shown for the purpose of illustrating the invention, it will be apparent to those skilled in the art that various changes and other modifications may be made therein without departing from the invention.

What is claimed is:

1. A tire, safety support and rim assembly comprising a split wheel rim with axially abutting sections, a pneumatic tire having a tread portion and bead portions mounted in axially spaced-apart bead seats on a generally cylindrical surface of said rim, an annular ring member of flexible resilient cushioning and sealing material having a radially inner base portion with a generally cylindrical radially inner surface mounted on said surface of said rim and extending from one of said bead portions to the other, said ring member having a radially outer portion with an outer diameter less than the diameter of said tread portion of the tire in the inflated condition and greater than the diameter of said inner base portion, an intermediate supporting portion of said ring member between said radially inner base portion and said radially outer portion, said base portion including a circumferentially continuous flange of said cushioning and sealing material on said radially inner surface of said base portion, said flange having an enlarged bulbous edge portion clamped in compression between said sections of said split rim and sealing the space between said sections, said inner surface having a base width measured axially of said ring member, said flange having a flange width measured axially of said ring member, and said base width being substantially greater than said flange width for stable transmission and cushioning of the load from said base to said rim by compression of said ring member and for holding said bead portions in a stable separated condition on said bead seats during operation of said tire in a deflated condition with said outer portion of said ring member in engagement with said tread portion.

2. An assembly according to claim 1 wherein said flange has a width greater than 10 but less than 15 percent of said base width.

3. An assembly according to claim 1 wherein said outer portion has an outer width measured axially of said ring member and said outer width is less than said base width.

* * * * *